United States Patent [19]

Lyons

[11] 4,231,537
[45] Nov. 4, 1980

[54] SATELLITE-LAUNCH VEHICLE COMBINATION AND METHOD

[75] Inventor: Michael T. Lyons, Fairfax, Va.

[73] Assignee: Satellite Business Systems, McLean, V.I.

[21] Appl. No.: 889,087

[22] Filed: Mar. 22, 1978

[51] Int. Cl.$^2$ .............................................. B64G 1/00
[52] U.S. Cl. .................................................... 244/160
[58] Field of Search ........................ 244/158, 160, 162

[56] References Cited

U.S. PATENT DOCUMENTS 4,009,851  3/1977  Cable .................................... 244/158

FOREIGN PATENT DOCUMENTS 1420957  1/1976  United Kingdom ..................... 244/158

OTHER PUBLICATIONS

Rockwell International, Artist's Concept Showing Space Shuttle with Communications Satellite, Pub. 3541-A-1, Rev. 1-77, Obtained at AIAA Conf., Washington, D.C., Feb. 9, 1978.

Primary Examiner—Barry L. Kelmachter
Attorney, Agent, or Firm—Pollock, Vande Sande & Priddy

[57] ABSTRACT

A satellite intended for insertion into a quasi-synchronous earth orbit is adapted for efficient launch by minimizing the amount of launch vehicle cargo capacity employed. The satellite includes at least one major thrust source, such as an apogee kick motor, defining a major thrust axis for the satellite. A reusable launch vehicle such as the Space Shuttle, includes a cargo bay whose largest dimension is parallel to the launch vehicle thrust axis. Minimizing satellite use of cargo bay capacity is obtained by adapting the satellite to lie within the cargo bay of the launch vehicle with its thrust axis perpendicular to the thrust axis of the launch vehicle.

14 Claims, 4 Drawing Figures

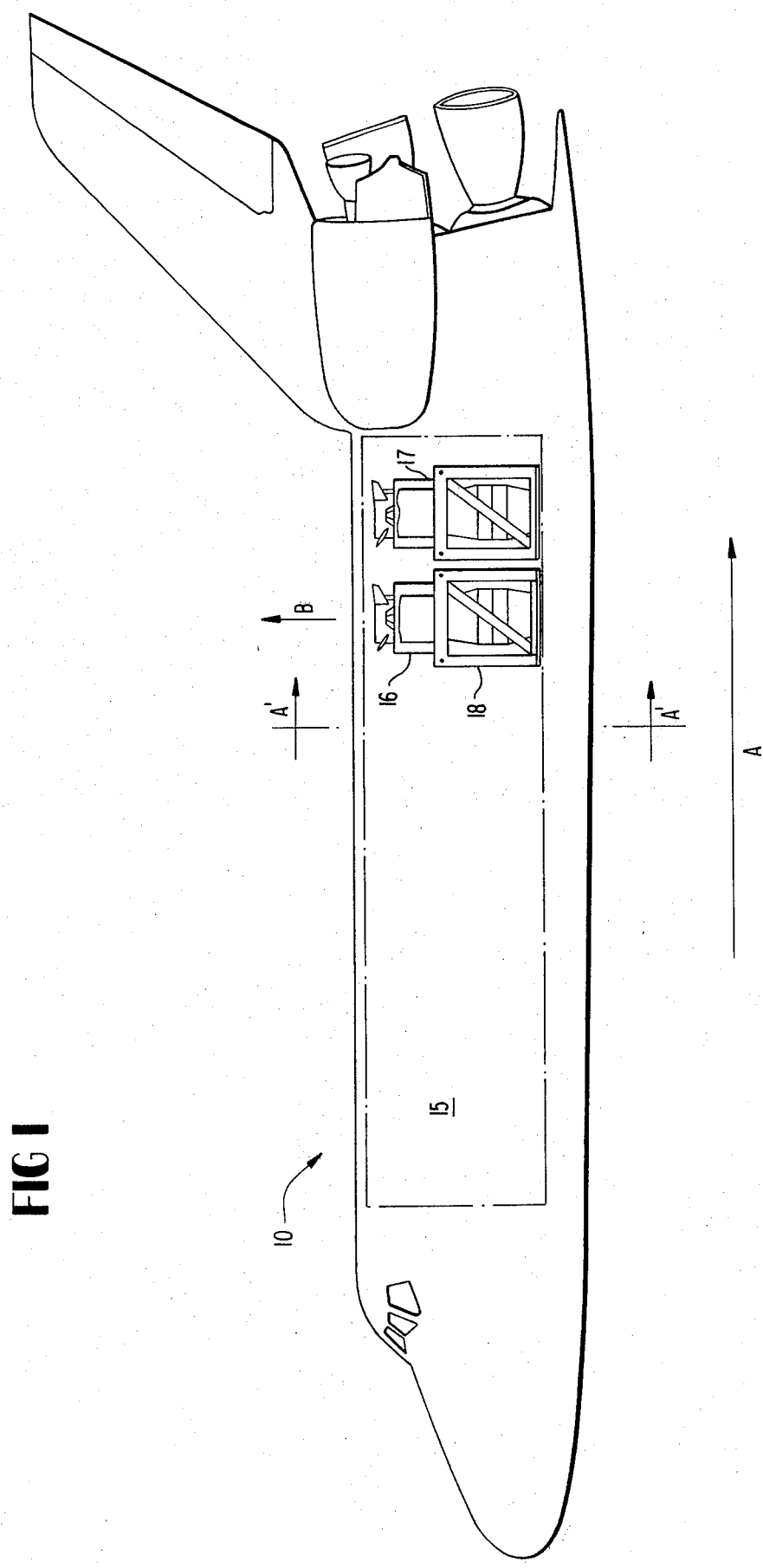

SATELLITE-LAUNCH VEHICLE COMBINATION AND METHOD

FIELD OF THE INVENTION

The present invention relates to improvements of satellites and methods of launching the same.

BACKGROUND OF THE INVENTION

The space age, defined as the time during which man had the capability of orbiting objects is now over 20 years old. In that period of time, many objects have been placed into earth orbit, and more recently, a favored type of earth orbit is a synchronous, or more properly, quasi-synchronous earth orbit in which the object placed in orbit appears relatively stationary to an observer on the earth. In the period since the beginning of the space age, the techniques and apparatus employed to place objects in orbit have been refined and developed. Up until quite recently, all launch vehicles were expended during the launching process and therefore the expense entailed in the lauching included the cost of constructing the launch vehicle.

Recently, however, the National Aeronautics and Space Administration (hereinafter NASA) began the development of a reusable launch vehicle, hereinafter referred to as the Space Shuttle. With the advent of this concept, the cost of the launch vehicle can now be spread over the launch of many satellites. In making the capabilities of the Space Shuttle available to industrial concerns, NASA has indicated that the launch cost for any satellite will be related to the cargo carrying capacity of the Space Shuttle which is employed by the satellite. The cargo carrying capacity of the shuttle is based on two factors, namely, weight and volume. To maintain the various payloads independent of each other, the volume factor is computed on the basis of the length of the cargo bay of the Space Shuttle employed.

Ever since the beginning of the space age, it has been a desirable goal for the design of satellites to minimize the weight thereof. Accordingly, a standard practice in designing a satellite is to design the satellite for the minimum possible weight. Therefore, in order to optimize the use of Space Shuttle capacity, the only factor available for adjustment is the length of the cargo bay employed.

Another characteristic one obtains when making lightweight satellites is that their strength or ability to survive loads is limited. Virtually all satellites intended for quasi-stationary orbit carry along with them at least one major source of thrust for orbital insertions as distinguished from a plurality of thrusters of much more limited thrust which are employed to make minor corrections in satellite orbit as well as to control its attitude in orbit. The structural design of the satellite has to take into account the load imposed by its own thrust source or motor and typically the satellite has a thrust axis defined by the orientation of its thrust source along which it is most readily capable of accepting loads.

In mating a satellite to a launch vehicle, it is conventional in the art to align the thrust axis of the satellite with the thrust axis of the launch vehicle. Insofar as I am aware, all previously launched satellites carrying their own major thrust source have been launched in a configuration in which their thrust axis was aligned with the thrust axis of the launch vehicle.

When the Space Shuttle was announced initial proposals for orienting a satellite in the cargo bay of the Space Shuttle employed the conventional technique of aligning the satellite thrust axis with the launch vehicle thrust axis. In some cases, it was proposed, in order to maximize the payload carried by the Shuttle, that several satellites be ganged on a single support and deployment structure. This technique has a number of serious disadvantages. In the first place, the ganged satellites are no longer independent, and a number of serious implications flow from this lack of independence. Firstly, not all satellites in their ganged configuration are available for ready removal. A further and significant disadvantage of stacking, satellites is the unknown interaction between them with reference to mechanical resonance. Thus, careful attention is paid during the design of a satellite to its susceptibility to vibrations at selected frequencies to insure that the vibrations induced during the launch process do not occur at mechanical resonance for the satellite. Without full knowledge of just which other satellites are to be ganged, this precaution cannot be taken and thus one cannot be assured that a satellite pair will not be subjected to vibration that would correspond to a resonance condition of the pair.

To overcome this and similar problems, it was also suggested that the satellite be supported in a cradle tilted at an angle of 43° with respect to the launch vehicle thrust axis. This separated the several satellites and avoided possible resonance effects, but this scheme, too, had a number of drawbacks. In the first place, the several satellites were still not independent in that removal of one or more satellites was required in order to get access to another. Furthermore, and more importantly, the benefits of canting the satellites at 43° were only achieved if all the satellites packed in the Shuttle were likewise canted.

It is therefore an object of the present invention to provide improvements in the methods of supporting satellites in launch vehicles. It is another object of the present invention to provide an improved launch vehicle and at least one satellite supported thereby. It is another object of the invention to provide a satellite in such a launch vehicle which includes a major thrust axis defined by at least one major source of thrust in which the satellite thrust axis is at or about a 90° angle with respect to the thrust axis of the launch vehicle. It is another object of the present invention to provide a method of adapting satellites for effective launch and efficiently utilizing the payload capacity of a launch vehicle in which the satellite has a major thrust axis defined by a major source of thrust and in which that major thrust axis is perpendicular to the thrust axis of the launch vehicle. These and other objects of the invention will become apparent as the description proceeds.

SUMMARY OF THE INVENTION

The invention meets these and other objects of the invention by providing a launch vehicle with a cargo bay of defined capacity and which also has a thrust axis, a satellite is included within the cargo bay, the satellite having a major source of thrust for defining a major thrust axis of the satellite, with the satellite supported in the cargo bay such that its major thrust axis is perpendicular to the launch vehicle thrust axis.

The improved method of adapting a satellite for effective launching efficiently utilizing the payload capacity of the launch vehicle includes the steps of providing a satellite having a major source of thrust defining a thrust axis for the satellite, and supporting the satellite in the cargo bay of the launch vehicle with its major thrust axis generally perpendicular to the thrust axis of the launch vehicle.

The present invention will be described in more detail in connection with the attached drawings in which identical reference characters identify identical apparatus and in which:

FIG. 1 is a side view of the Space Shuttle, partially broken away, to show a pair of satellites or spacecraft supported in the cargo bay in accordance with the principles of the invention;

DETAILED DESCRIPTION OF THE INVENTION

The present invention is directed at apparatus and methods for efficiently utilizing the NASA Space Shuttle which includes a cargo bay adapted to carry one or more payloads into orbit. The present invention is particularly directed at efficiently utilizing the cargo bay of the Space Shuttle for launching a satellite intended for insertion into a quasi-synchronous earth orbit, which satellite, for example, may comprise a communications satellite.

The Space Shuttle cargo bay is a cylinder with a 15-foot diameter and a 60-foot length.

FIG. 1 is a side view of the Space Shuttle 10 partially broken away to show the cargo bay 15. As is well-known to those skilled in the art, the Shuttle 10 is adapted to be launched in a configuration attached to a separate booster (not illustrated). Furthermore, in the launch mode, the longitudinal axis of the Shuttle, running from nose to tail, is in a vertical position and the thrust axis of the launch vehicle lies in the direction of the arrow A.

FIG. 1 depicts the cargo bay 15 of the Shuttle 10 broken away to show the manner in which two spacecraft or satellites are mounted therein during the launch phase. It will be understood that in actuatl practice, substantially the entire cargo bay 15 could be filled, and the two spacecraft 16 and 17 are shown for purposes of illustration only. As will be explained in more detail in connection with FIGS. 2A and 2B, each of the spacecraft is intended for quasi-synchronous earth orbit and each spacecraft includes at least one major thrust source such as an apogee kick motor. Alignment of the apogee kick motor with the spacecraft 16 defines a major thrust axis of the spacecraft which is in the direction of the arrow B. For the purposes of this application, the terms major thrust and major thrust axis refer to a motor and its direction of application of force, such as an apogee or perigee kick motor which is capable of changing the orbital parameters of the spacecraft and is used for orbit insertion. Such motor is in contrast to relatively smaller thrusters which may be included in the spacecraft for purposes of minor orbital corrections and adjusting spacecraft orientation.

Figure 2B:
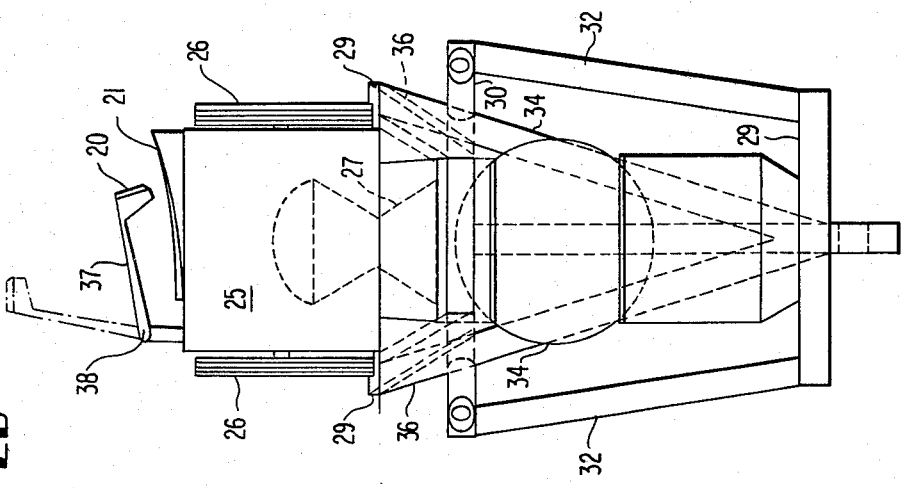
FIGS. 2A and 2B are, respectively, detail end and side views of a typical satellite in its supported mode in the cargo bay.
Figure 2A:
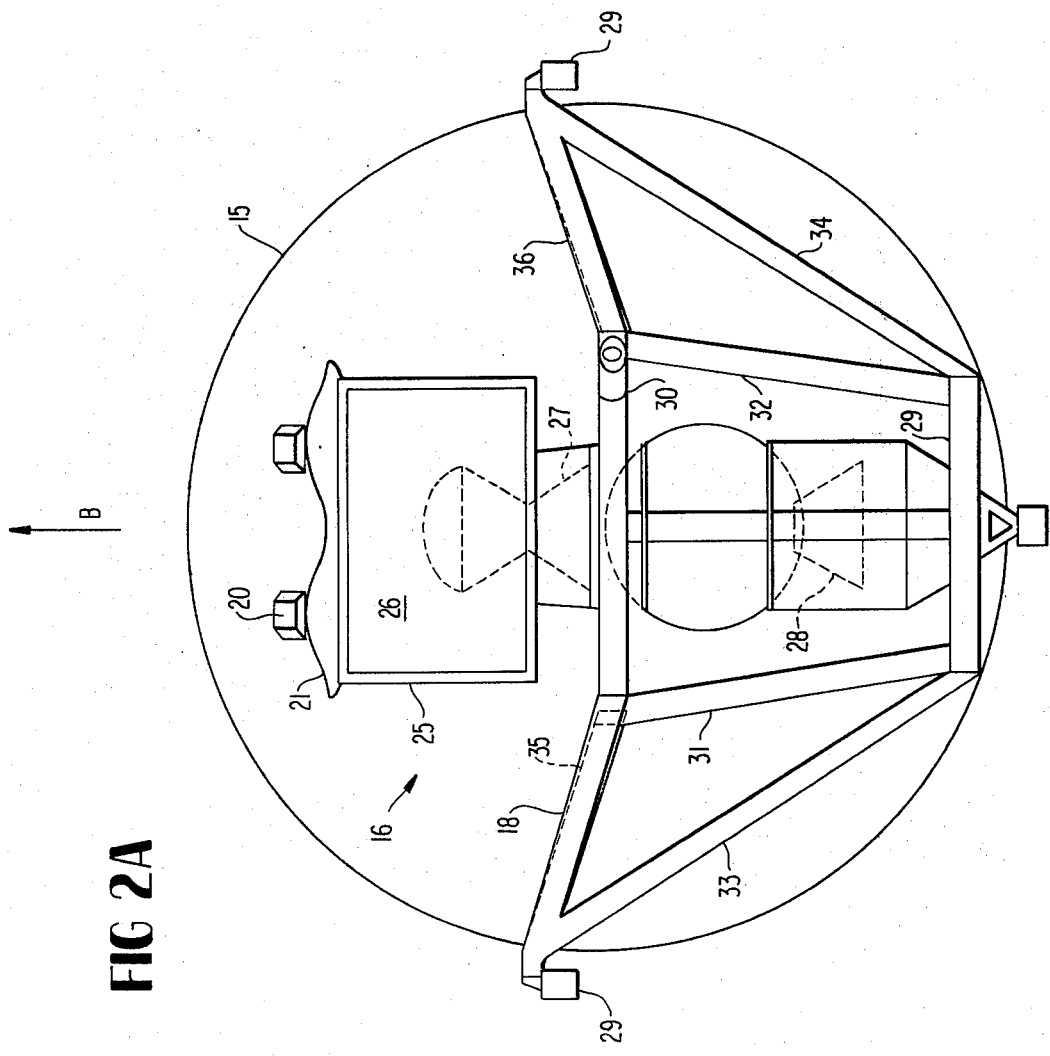

As shown in FIG. 1, each of the spacecraft 16 is supported by a cradle 18 with its major thrust axis generally perpendicular to the thrust axis of the launch vehicle. Reference is now made to FIGS. 2A and 2B to show in further detail various components of the spacecraft 16 and of the cradle 18, and the manner in which they are secured to the Shuttle 10.

FIGS. 2A and 2B illustrate, respectively, a cross-section of the Shuttle taken on the line A-A' and FIG. 2B is a magnified view of the typical spacecraft 16 supported on its cradle 18 within the confines of the cargo bay 15.

For purposes of illustrating the principles and apparatus of the invention, a spacecraft 16 whose outlines will be described comprises an RCA SATCOM communication satellite. After a review of the specification, those skilled in the art will be able to apply the principles and methods of the invention to other conventional satellites or spacecraft as well as satellites and spacecraft yet to be designed.

The communication satellite illustrated herein, like many conventional communication satellites intended for quasi-synchronous earth orbit, includes as four (4) major components as well as various other subsystems and a structure to support these components. The four major components are:

(1) an antenna system for the transmission and reception of radio signals which typically includes a reflector and an antenna feed;

(2) a solar collector array and an electrical storage system for the transformation and storage of solar to electrical energy for powering various components of the spacecraft;

(3) the active communication, command and control equipment employed for the purposes of receiving information via the antenna system and transmitting information via the antenna system as well as command and control components for controlling the communication equipment as well as other subsystems of the spacecraft; and (4) at least one major source of thrust such as an apogee kick motor for proper insertion of the spacecraft into the desired orbit. Since these various components are well known to those skilled in the art, only their relative locations in the spacecraft body will be explained inasmuch as the operation of the spacecraft, once it has been inserted into orbit, forms no part of the present invention.

FIG. 2A illustrates the spacecraft 16 and its cradle 18 lying within the circumference of the cargo bay 15. More particularly, spacecraft 16 includes a pair of antenna feeds 20, which are shown in their folded configuration, which will be apparent from a review of FIG. 2B, and the associated reflectors 21. These elements in turn are mounted on a communication equipment casing 25 and include a series of solar collector panels 26 also in a folded configuration. The center of the communications casing 25 is hollow and includes the nozzle 27 of an apogee kick motor supplying thrust along the major thrust axis B of the spacecraft. Although not essential to the invention, I prefer also to employ a perigee kick motor aligned along the same axis B and as the apogee kick motor. Thus, as shown in FIG. 2A, the perigee kick motor includes a nozzle 28.

The satellite or spacecraft 16 is supported in the cargo bay 15 on a cradle 18. More particularly, as shown in FIG. 2A, the cradle 18 includes a frame for supporting the spacecraft 16 comprising a box-like structure including a pair of generally parallel rectangular frames 29 and 30. The frames 29 and 30 are joined by two pairs of struts 31 and 32. The cradle structure formed by the frames 29, 30 and the pairs of struts 31 and 32 are supported in the cargo bay by four pairs of outrigger arms 33, 34 and 35, 36. The ends of the arms 33-36 may be bolted or otherwise fixed to a pair of struts 29 included in the frame of the Shuttle.

A side view of FIG. 2A is illustrated in FIG. 2B. In addition to showing a side view of the cradle 18, FIG. 2B also illustrates in more detail some of the various components of the spacecraft 16. Thus, the folded solar reflector panels 26 are illustrated, the antenna reflector 21 and the antenna feed 20. As shown in FIG. 2B, the antenna feed 20 is supported on a mast 37 which is pivoted at pivot 38. In its extended position (shown in phantom) the antenna feed 20 is in its deployed or operative position. For purposes of stowing the spacecraft 16 within the confines of the cargo bay 15, the mast 37 is pivoted about the pivot 38 as shown in full line in FIG. 2B. It is believed that from the foregoing description the remaining components shown in FIG. 2B will be understood by those skilled in the art.

Figure 3:
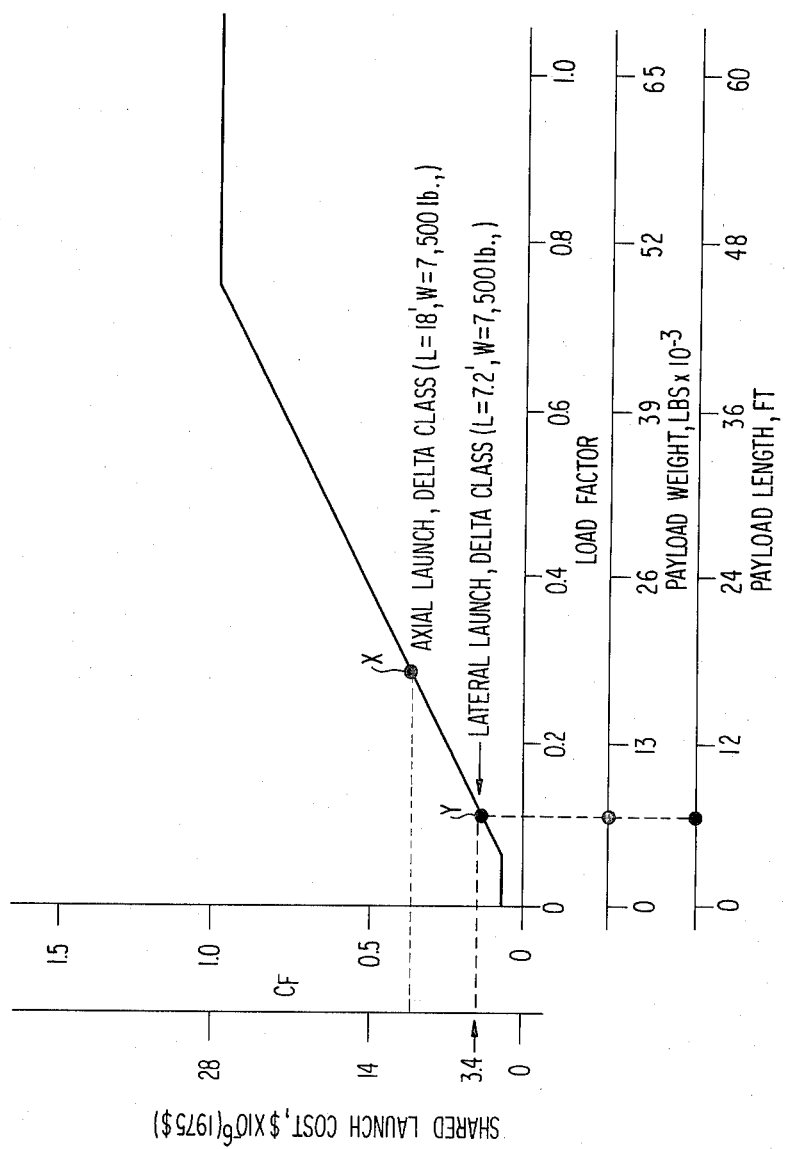
FIG. 3 is a curve relating cargo bay capacity versus satellite weight and length.

FIG. 3 is helpful in understanding the advantages derived from use of the invention along with the Space Shuttle. FIG. 3 shows, on a horizontal axis, the total payload length of the cargo bay of the Shuttle, on a parallel axis the total payload weight, and on still another parallel axis the load factor, i.e., the percentage of the load employed for any weight or length. The vertical axis is divided into cost percentages from 0 to 100%. The two points plotted in FIG. 3, X and Y, relate respectively to a common spacecraft oriented in a conventional fashion (X) or oriented in a fashion in accordance with the principles of the invention (Y). In the conventional mode the dominant factor is the 18 feet of cargo bay length occupied by the spacecraft. This corresponds to 30% of the payload of the Shuttle. On the other hand, in accordance with the principles of the present invenion, only about 7.2 feet (or less than 90 inches) of cargo bay length are occupied by the spacecraft. Both the length occupied and the weight correspond to about 12½% of the spacecraft payload.

The conventional mode of spacecraft alignment in a launch vehicle, i.e., with its major thrust axis parallel to the launch vehicle thrust axis was in part due to the structural characterisitcs of the spacecraft which is strongest in the direction of its own thrust axis. Care must be taken before aligning a spacecraft transverse to the thrust axis of the launch vehicle to insure that the loads imposed during launch do not exceed the capability of the spacecraft. Fortunately, forces exerted during the shuttle launch are relatively low, i.e., less than 4 g's as compared to the typical forces exerted during launch of other vehicles such as the Delta launch vehicle which can be up to 10 g's.

In practicing the invention, it can be assumed that with the functions to be performed by the satellite, employing state of the art techniques, a minimum weight will be established, regardless of the form, shape or volume within which the components are packaged. Typical satellites were configured with their longest dimension parallel to their major thrust axis. To minimize cargo bay length occupied desirably the longest dimension (which typically is along the thrust axis) is aligned perpendicular (or nearly so) to the length of the cargo bay, which length is parallel to the launch vehicle thrust axis. If the overall length of the spacecraft is greater than the diameter of the cargo bay consideration is given to stowing or folding or the like to those components which cause the length of the spacecraft to exceed the cargo bay diameter. In some cases, a slight tilt, such as 10°, might eliminate the need of one or more articulations of the payload. For example, the spacecraft shown in FIG. 2A has dimensions in a rectangular coordinate system of $L \times M \times N$ in its deployed condition and occupies a volume V, where $V = L \cdot M \cdot N$. If its length with the feed in a folded condition is $L'$ where $L' < L$, then in the stowed configuration, it occupies a volume $V'$ where $V' = L' \cdot M \cdot N$. In some circumstances, tilting the thrust axis B to be near, but less than 90°, for example by 10°, may eliminate the necessity for folding or stowing.

More particularly, where articulation of a satellite component is required to orient the satellite in the cargo bay as shown herein and the satellite weight, expressed as a percentage of payload capacity is larger than cargo bay length required it may be advisable to tilt the satellite by up to about 10° if this will eliminate the articulation requirement.

For example, assume launch vehicle payload P and cargo bay length L, satellite weight S, length along the major thrust axis D and width perpendicular to major thrust axis W. If $S/P > W/L$, then more cargo bay length can be used without additional penalty, until $L'/L = S/P$, wherein $L'$ is the cargo bay length occupied by the satellite, where $L' > W$, caused by tilting. Tilting the satellite increases the length of the satellite, along its major thrust axis, which may be accommodated within the diameter of the bay. If we define a tilt angle $\delta$, as the difference between spacecraft and launch vehicle thrust axes and 90° we find that the cargo bay length required increases at an accelerating rate for $\delta > 10°$ and the additional satellite length that may be accommodated within the cargo bay increases relatively slowly for small angles, and so I prefer to keep $\delta \leq 10°$.

From the preceding discussion, those skilled in the art will realize that satellites or spacecraft other than the one specifically illustrated herein can enjoy the advantages of the invention so long as their configuration is such as to fit within the cargo bay diameter with their major thrust axis transverse or nearly so to the launch vehicle thrust axis. The spacecraft shown in this application required employment of stowage techniques, i.e., the solar panels 26 are folded and the antenna feed mast is also folded. Other techniques for stowing these or other components of other spacecraft can be employed which techniques are well known to those skilled in the art.

What is claimed is:

1. A reusable satellite launch vehicle and at least one satellite supported therein comprising:
    a launch vehicle having a cargo bay of given dimensions with a thrust axis,
    satellite cradle means mounted within said cargo bay for support of a satellite thereby,
    said satellite mounted within said cradle means and including at least one source of major thrust defining a major thrust axis for said satellite,
    said cradle means supporting said satellite with said major thrust axis substantially perpendicular to said launch vehicle thrust axis.

2. The apparatus of claim 1 wherein said launch vehicle thrust axis is parallel to a largest dimension of said cargo bay.

3. The apparatus of claim 1 wherein said satellite has a deployed condition in which said satellite lies within a volume V and wherein said satellite includes at least one member movable to stowed position to provide a stowed volume $V'$ wherein $V'$ is less than V.

4. The apparatus of claim 1 wherein said axes are perpendicular.

5. The apparatus of claim 1 wherein said satellite is supported by said cradle means with the satellite's major thrust axis at an angle $\theta$ to said launch vehicle thrust axis where $80° \leq \theta \leq 100°$.

6. The apparatus of claim 5 wherein said reusable satellite launch vehicle has a payload capacity of P and said cargo bay length is L, said satellite has a weight S and said satellite has a length, parallel to said major thrust axis, of D and a width, perpendicular to said major thrust axis, of W and wherein $S/P > W/L$.

7. The apparatus of claim 1 wherein said satellite source of major thrust includes an apogee and perigee kick motor aligned with said major thrust axis.

8. A satellite launch vehicle and at least one satellite supported therein comprising:
- a reusable launch vehicle having a cargo bay of given dimensions with a thrust axis parallel to a largest of said given dimensions,
- satellite cradle means mounted within said cargo bay for support of a satellite thereby,
- said satellite mounted within said cradle means and including at least one source of major thrust defining a major thrust axis for said satellite,
- said satellite having its major dimension extending parallel to said major thrust axis,
- said cradle means supporting said satellite with said major thrust axis at an angle of about 90° to said launch vehicle thrust axis.

9. The apparatus of claim 8 wherein said satellite has a deployed condition in which said satellite lies within a volume V and wherein said satellite includes at least one member movable to a stowed position to provide a stowed volume V' wherein V' is less than V.

10. The apparatus of claim 8 wherein said axes are perpendicular.

11. A method of adapting a satellite intended for quasi-synchronous orbit for efficient launch via a reusable launch vehicle with defined cargo bay to minimize use of launch vehicle payload capability comprising the steps of:
- providing said satellite with at least one major thrust motor such as an apogee kick motor whose orientation defines a major thrust axis for said satellite,
- dimensioning said satellite so that when mounted for launch said satellite lies within a portion of said cargo bay wherein the improvement comprising:
- dimensioning said satellite to fit within said cargo bay with said major thrust axis at an angle of about 90° to a launch vehicle thrust axis.

12. The method of claim 11 which includes the step of supporting said satellite in said launch vehicle with said major thrust axis at about a 90° angle with respect to said launch vehicle thrust axis.

13. The method of claim 12 in which said supporting step includes the step of:
- providing a cradle fixed to said launch vehicle to support said satellite at said angle.

14. The method of claim 11 wherein said axes make an angle of between 80° and 100°.

* * * * *

UNITED STATES PATENT AND TRADEMARK OFFICE
CERTIFICATE OF CORRECTION

PATENT NO. : 4,231,537
DATED : November 4, 1980
INVENTOR(S) : Michael T. Lyons

It is certified that error appears in the above—identified patent and that said Letters Patent is hereby corrected as shown below:

On the cover page of the Patent at line designation

[73] "Assignee: Satellite Business Systems, McLean, V.I."

should read--Satellite Business Systems, McLean, Va.--

Signed and Sealed this

Third Day of February 1981

[SEAL]

Attest:

RENE D. TEGTMEYER

Attesting Officer     Acting Commissioner of Patents and Trademarks